United States Patent
Hansson et al.

[11] Patent Number: 6,113,319
[45] Date of Patent: *Sep. 5, 2000

[54] CUTTING INSERT HOLDER FOR TURNING OPERATION

[75] Inventors: Per Hansson, Gavle, Sweden; Karl-Göran Brask, Singapore, Singapore

[73] Assignee: Sandvik Aktiebolag, Sandviken, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 09/083,115

[22] Filed: May 22, 1998

[30] Foreign Application Priority Data

May 22, 1997 [SE] Sweden ................. 9700900

[51] Int. Cl.$^7$ .................................... B23B 27/08
[52] U.S. Cl. ..................... 407/66; 407/109; 407/110; 407/119
[58] Field of Search .............. 407/66, 109, 110, 407/113, 99, 118, 119, 120, 32; 408/143, 144, 145

[56] References Cited

U.S. PATENT DOCUMENTS

| | | | |
|---|---|---|---|
| 2,577,043 | 12/1951 | Steffes | 407/110 |
| 2,842,014 | 7/1958 | Miller | 408/144 |
| 2,944,323 | 7/1960 | Stadler | 407/110 |
| 3,748,710 | 7/1973 | Lynch | 407/66 |
| 4,145,213 | 3/1979 | Oskarsson et al. | |
| 4,195,956 | 4/1980 | Mihic | |
| 4,588,333 | 5/1986 | Gustafson | |
| 4,618,540 | 10/1986 | Von Holst et al. | 428/552 |
| 4,668,132 | 5/1987 | Villa et al. | 407/110 |
| 4,801,224 | 1/1989 | Pettersson et al. | |
| 4,909,677 | 3/1990 | Noguchi et al. | 407/110 |
| 4,998,851 | 3/1991 | Hunt | 408/143 |
| 5,688,080 | 11/1997 | Hedlund | |

FOREIGN PATENT DOCUMENTS 0 259 847  3/1988  European Pat. Off. .

*Primary Examiner*—Henry W. H. Tsai
*Attorney, Agent, or Firm*—Burns, Doane, Swecker & Mathis, L.L.P.

[57] ABSTRACT

A blade-shaped tool holder for metal cutting machining comprises a blade part formed of a first metallic material, and a core of a sub micron hard material disposed in the blade part for stiffening the blade part.

5 Claims, 2 Drawing Sheets

CUTTING INSERT HOLDER FOR TURNING OPERATION

BACKGROUND OF THE INVENTION

The present invention refers to an insert holder of the blade type intended foremost for different turning applications, such as grooving, face grooving and parting. Slitting cutters and circular saw blades are also included in the term "blade type" insert holder.

Cutting inserts for grooving and parting are clamped in holders of the blade type, in order to allow narrow widths of cut. Such blade holders are normally made of steel, for example tool steel, and feature a number of different clamping arrangements for the actual cutting inserts. The inserts are made of hard material, generally cemented carbide. Different examples of various designs of clamping systems for cutting inserts in blade holders are referred to in U.S. Pat. Nos. 4,801,224; 4,588,333; 4,195,956; and EP-A-259 847. The cutting inserts are clamped in the free end of the blade holder, while the blade holder itself forms a part of a tool which even includes a tool shank that extends across the blade. The actual blade part can either be an integral part of the shank, or the blade part can be clamped in the shank portion by, for example, a screw or wedge-coupling, see for example Hedlund U.S. Pat. No. 5,688,080.

Common for all blade holders, irrespective of the design of the clamping system for the cutting insert, is that they can begin to vibrate, which naturally is a clear drawback. The vibration leads, for example, to poorer surface finish on the workpiece, damage to the cutting insert and even tool failure may occur.

Another problem with a large number of blade holders, in particular with narrow width and/or long overhangs, is an outward bending, or deflection of the blade part because of axial and tangential cutting forces.

The purpose of the present invention is consequently to diminish the tendency to vibration in holders of the blade type.

An additional purpose with the present invention is to reduce, as far as possible, all manner of bending of the blade part.

SUMMARY OF THE INVENTION

The objects of the invention are achieved by a blade-shaped tool holder for metal cutting machining. The tool holder includes a sub-micron hard material. Preferably, the holder comprises a blade part formed of a first metallic material, and a core of a sub micron hard material disposed in the blade part for stiffening the blade part.

Preferably, the hard material consists essentially of 30–70% by volume sub micron hard constituents in the form of carbides, nitrides, carbonnitrides, or mixtures thereof of one or more metals selected from the group consisting of Ti, Zr, Hf, V, Nb, Ta, Cr, Mo, and W in a metallic matrix of one of more metals selected from the group consisting of Fe, Co and Ni.

BRIEF DESCRIPTION OF THE DRAWING

In order to illustrate but in no way limit the invention it will now be described in more detail with reference to the attached drawings.

DETAILED DESCRIPTION OF PREFERRED EMBODIMENTS OF THE INVENTION

Figure 1:
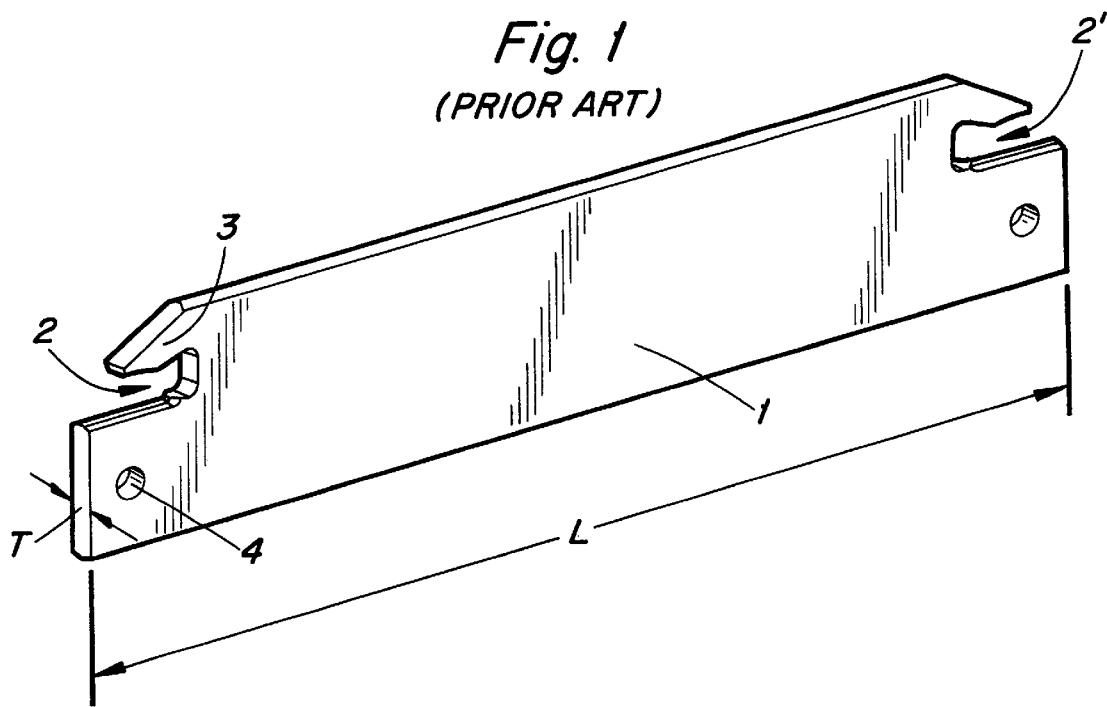
FIG. 1 shows a typical blade holder according to known technique, with two insert pockets.

FIG. 1 shows a one-piece blade holder 1 for the turning of grooves and parting operations. These vary in thickness T but are in general between 1 and 8 mm thick. They have two ends spaced apart along a length L of the holder and a cutting insert position, i.e., pocket, 2, 2 at each end, for the clamping of a cutting insert of usually coated or uncoated cemented carbide. Each pocket 2 includes a slot extending along a part of the length, and extending completely across the thickness. The slot is open at the respective end of the blade part. The cutting insert is held firmly by the clamping force which an upper clamping part 3 exerts on the cutting insert. Further the holder features a transverse hole 4 at each end into which can be inserted one pin of a special key intended for the installation of the cutting insert. It should however be pointed out, that the actual type of clamping of the cutting insert is of no importance for the present invention. The blade holder 1 is clamped in a tool shank which is not illustrated. Normally a cutting insert is used only in one insert pocket 2, 2' at a time for the machining of metal by cutting. Alternatively the blade holder 1 can be shorter and equipped with only one of the two insert pockets. Further the blade holder can form an integral part of a tool shank.

As mentioned above, all tool holders of the blade type suffer from a certain propensity to vibration, in particular when the free overhang of the holder is relatively large and the blade holder is relatively thin. Further a certain degree of sideways deflection or downwards deflection commonly occurs, as a function of the blade thickness and the size of the cutting forces, among other things. The present invention has in a surprising manner succeeded in considerably reducing the tendency to such vibration, and considerably reduced the degree of bending, by producing the blade holder wholly or preferably partly in a hard material with 30–70% by volume sub micron hard materials in the form of carbides, nitrides and/or carbonitrides of Ti, Zr, Hf, V, Nb, Ta, Cr, Mo and/or W in a metallic matrix based on Fe, Co and/or Ni. The hard material preferably consists of 30–70% by volume hard constituents of mainly TiN in a matrix of a high speed steel type, where the concentrated hard materials have a grain size of 1 $\mu$m, preferably less than 0.5 $\mu$m. This material is in itself previously known from, for example, SE-C-392 482. Further the compound material is known previously from, for example, SE-C-440 753, in which this sub micron material is covered. Such a material is commercially available under the trademark CORONITE®. This material can be metallurgically bonded to a tougher material such as tool steel, in accordance with said patent SE-C-440 753. The present inventors have discovered that it is possible to manufacture a holder of the blade type from this material and that the material is able to impart the blade type holder with an anti-vibration characteristic.

The embodiments in FIG. 2a–2h illustrate a number of different conceivable cross sections of a blade holder according to the present invention. References numerals 5a–5h show matrices of, for example, billets of tool steel having cavities formed therein, and reference numerals 6a–6b show different cores of sub micron hard materials disposed in the cavities. These profiles have been produced by force injecting the hard material into the cavity in the form of a ribbon which adheres to the steel, whereby there may be performed a subsequent rolling process.

The force injection of a ribbon of material is a method well-known by those skilled in the art of working metallic materials, which gives the possibility even to shape alloys which are relatively difficult to machine. In trials it has been shown possible to force-inject hot ribbons of alloys which are extremely rich in hard material, even tungsten carbide alloys with a content of hard material as high as 80% WC by weight. Further, according to the known technique, it is possible to extrude together two or more materials with different properties to form machine parts of the compound material.

It is specifically through such a method of force injecting a ribbon, that cross sections according to the FIGS. 2a–2h can be produced. The different shapes are attained by milling or drilling out one or more cavities in a steel billet 5a–5h and subsequently filling the cavity or cavities with a powderous ribbon of a sub micron hard material. During the force injection of a ribbon the hard constituents are sintered and enter into a metallurgical bonding with the surrounding steel. If no rolling operation is applied after the extrusion, the drilled holes retain their circular shape, according to FIG. 2a and 2g. If however the ribbon is rolled a number of times after the force injection, the bores and thereby the hard constituents will take on a more and more elliptical shape, see FIG. 2F. According to FIG. 2h the blank has been force injected to a curved cross section, which is intended to be used for face grooving. It is possibly to force inject the blade holder directly to the final shape desired (with or without rolling), but usually a final processing is required in order to attain the dimensions and surface finish wished for. If the tool steel surrounds one or more cores of sub micron hard material, it conveys the advantage that the surface can be machined by conventional metal cutting machining, such as milling. If however the sub micron hard material lies wholly or partly at the outer surfaces, these parts must be ground. This latter requirement applies, for example, to the embodiments according to FIGS. 2c, 2d and 2e.

Figures 2A, 2B, 2C, 2D:
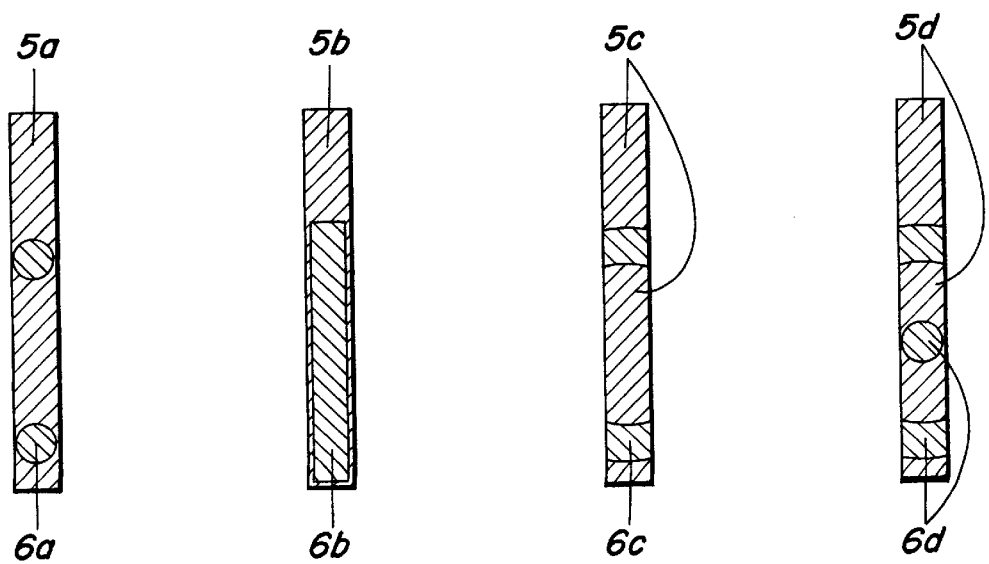
FIG. 2a is a cross sectional view taken through the blade holder of FIG. 1 to depict a first reinforcement embodiment according to the invention.
FIG. 2b is a cross sectional view taken through the blade holder of FIG. 1 to depict a second reinforcement embodiment according to the invention.
FIG. 2c is a cross sectional view taken through the blade holder of FIG. 1 to depict a third reinforcement embodiment according to the invention.
FIG. 2d is a cross sectional view taken through the blade holder of FIG. 1 to depict a fourth reinforcement embodiment according to the invention.
Figure 2E:
FIG. 2e is a cross sectional view taken through the blade holder of FIG. 1 to depict a fifth reinforcement embodiment according to the invention.
Figure 2F:
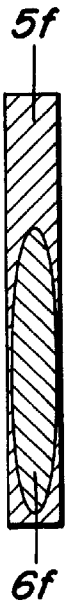
FIG. 2f is a cross sectional view taken through the blade holder of FIG. 1 to depict a sixth reinforcement embodiment according to the invention.
Figure 2G:
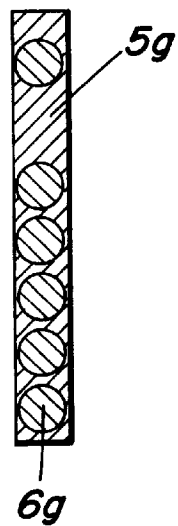
FIG. 2g is a cross sectional view taken through the blade holder of FIG. 1 to depict a seventh reinforcement embodiment according to the invention.
Figure 2H:
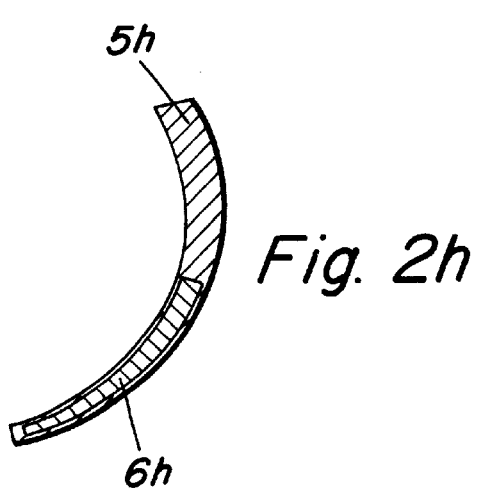
FIG. 2h is a cross sectional view taken through the blade holder of FIG. 1 to depict a eighth reinforcement embodiment according to the invention.

Through tests which have been performed, it has been established that blade holders according to this invention exhibit a considerably higher Young's modulus and considerably reduced vibration. Consequently two blade holders in accordance with FIG. 1 were compared, one comprised wholly of tool steel and one comprised of tool steel 5f with a core 6f of a sub micron hard material, in accordance with FIG. 2F. The free overhang in both cases was 32 mm and in both the cases the cross section of the blade was 30×4.35 mm. A tangential cutting force of 2700 N, was applied at the cutting edge to produce downwards deflection. Further in another test an axial force of 1250 N was applied to the cutting edge causing an outward bending force of Ff. The results obtained were as follows:

|  | Deflection downwards (Fc = 2700N) | Deflection sideways (Ff = 1250 N) |
| --- | --- | --- |
| Standard blade | 0.03 mm | 0.45 mm |
| Blade according to FIG. 2f | 0.025 mm | 0.25 mm |

Thus considerably improved results were obtained for the compound blade according to FIGS. 2a–2h of the invention. A blade holder which is considerably stiffer has thus been developed. Further in blades according to the invention, natural frequency increased considerably, in comparison with the conventional blades.

Although the present invention has been described in connection with preferred embodiments thereof, it will be appreciated by those skilled in the art that addition, deletions, modifications, and substitutions not specifically described may be made without departing from the spirit and scope of the invention as defined in the appended claims.

What is claimed is:

1. A blade-shaped tool holder for metal cutting machining, comprising:
    a one-piece blade part formed of steel, and having a length and a thickness, the length being greater than the thickness, the blade part having first and second ends spaced apart along the length, at least one of the ends forming an insert pocket adapted to receive a cutting insert, the insert pocket formed by the steel of the one-piece blade part, and
    a core of a sub-micron material disposed in the one-piece blade part in spaced relationship to the insert pocket and extending along the entire length of the blade part, the sub-micron material being harder than the steel of the one-piece blade part.

2. The blade-shaped holder according to claim 1 wherein the sub-micron material consists essentially of 30–70% by volume sub micron hard constituents in the form of carbides, nitrides, carbonitrides or mixtures thereof of one or more metals selected from the group consisting of Ti, Zr, Hf, V, Nb, Ta, Cr, Mo and W in a metallic matrix of one or more metals selected from the group consisting of Fe, Co, and Ni.

3. The blade-shaped holder according to claim 2 wherein the sub-micron material comprises 30–70% by volume hard constituents of TiN in a matrix of high speed steel where the hard constituents have a grain size less than 1 $\mu$m.

4. The blade-shaped holder according to claim 1 wherein the insert pocket comprises a slot extending along a part of the length of the blade part and extending completely across the thickness of the blade part, the slot being open at the respective end of the blade part.

5. The blade-shaped holder according to claim 4 wherein the slot is formed by opposing walls adapted to clamp a cutting insert therebetween.

* * * * *